United States Patent
Chritz, Jr. et al.

(10) Patent No.: US 6,430,120 B1
(45) Date of Patent: Aug. 6, 2002

(54) METHOD AND APPARATUS FOR PROVIDING A RESUME FUNCTION FOR A DISC PLAYER

(75) Inventors: Donald James Chritz, Jr.; James Robert Pressgrove, both of Kokomo; Dan Darryl Carman, Russiaville, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/237,313

(22) Filed: Jan. 26, 1999

(51) Int. Cl.$^7$ ............................................. G11B 17/22
(52) U.S. Cl. .................................. 369/30.12; 369/44.28
(58) Field of Search ............................. 369/32, 44.27, 369/44.28, 44.29, 30.12, 44.11, 30.15, 30.1, 30.11, 30.14, 13.17, 13.26, 44.32, 53.28, 53.29

(56) References Cited

U.S. PATENT DOCUMENTS 4,841,505 A * 6/1989 Aoyagi ......................... 369/32
5,682,362 A * 10/1997 Suzuki et al. ................. 369/32

* cited by examiner

Primary Examiner—Ali Neyzari
(74) Attorney, Agent, or Firm—Jimmy L. Funke

(57) ABSTRACT

A compact disc player includes an optical pickup supported by a carriage and a microprocessor for controlling the movement of a coarse actuator and a fine actuator. The coarse actuator controls the movement of the carriage and maintains its position when power is interrupted to the coarse actuator. The fine actuator is disposed between the carriage and the pickup and provides fine movement for the pickup when power is supplied to the actuator. The fine actuator moves the pickup to a neutral position when power is interrupted. A resume function is provided that restores the position of the pickup after a power interruption to its position before the interruption. A value indicative of the position of the pickup relative to the carriage is stored in memory. When power is restored to the disc player, the value is read from memory. The disc control microprocessor directs incremental movements of the fine actuator until the position of the pickup corresponds to the position represented by the stored value.

23 Claims, 4 Drawing Sheets

METHOD AND APPARATUS FOR PROVIDING A RESUME FUNCTION FOR A DISC PLAYER

FIELD OF THE INVENTION

The present invention relates generally to methods and systems for controlling a disc player after power has been interrupted and then reconnected. More specifically, the inventive method and apparatus provides a resume function for the disc player that restores the position of the disc pickup to its position prior to the power interruption.

BACKGROUND OF THE INVENTION

Compact discs (referred to as "CD's") carry data recorded on a track that is in a spiral or concentric form on a recording medium. In a conventional CD player, a pickup device is conveyed radially across the CD. The pickup device is an optical pickup that relies upon radiating a laser beam onto the track and detecting changes in the reflected beam. Electronics within the CD player converts the sensed reflected signal to a digital bit stream. For an audio CD, this digital bit stream is subsequently converted to an audio signal.

One typical construction for a CD player is shown in FIG. 1. The disc player includes a motor 10 that rotates a platen supporting the compact disc D. A disc control microprocessor 12 controls the operation of the motor 10 to maintain a controlled speed of rotation for the disc D.

An optical pickup 14 is disposed beneath the recorded surface of the disc D. Signals generated by the optical pickup 14 can be provided to signal processing electronics within the disc player (not shown). In one type of CD player, the optical pickup 14 is carried by a fine actuator 16 that is operable to translate the pickup back and forth in a track access direction. This track access direction is substantially radial relative to the disc D. The fine actuator 16 is mounted to a carriage 18 that is propelled by a coarse actuator 20 through a transmission mechanism 22. The coarse actuator 20 can constitute a servomotor that operates the transmission mechanism 22 to translate the carriage 18 in the track access direction. In certain embodiments, the transmission mechanism 22 can constitute a rack and pinion device or a rotating drive screw.

Operation of the coarse actuator and transmission mechanism 22 provides coarse movement of the carriage 18, and consequently the optical pickup 14, relative to the disc D. On the other hand, the fine actuator 16 provides for smaller incremental motion of the optical pickup 14 relative to the disc D. In other words, the fine actuator 16 provides a finer tolerance movement of the pickup than is accomplished by the coarse actuator 20.

The fine actuator 16 can constitute an electromagnetic coil apparatus. Voltage applied to the coil apparatus causes the fine actuator 16 to translate the optical pickup 14 relative to the carriage 18. In the illustrated system, the fine actuator 16 maintains the optical pickup 14 in a neutral position in the absence of an impressed voltage to the actuator. A spring element 15 can be disposed between the pickup 14 and the carriage 18 to restore the pickup to the neutral position once the fine actuator 16 is de-energized. In contrast, the coarse actuator 20 does not maintain a neutral position for the carriage 18. Instead, the carriage 18 remains in its then current position when the coarse actuator 20 is de-energized. Typically, the coarse actuator 20 is servo-locked so that the carriage 18 will not change position even when the disc player is vibrated or jarred.

The operation of the fine actuator 16 is governed by a fine actuator controller 26. Signals are transmitted to and from the fine actuator 16 and actuator controller 26 by way of signal lines 25. Likewise, the coarse actuator 20 is governed by a coarse actuator controller 28. Signals pass on lines 27 between the controller 28 and the coarse actuator 20. The disc control microprocessor 12 transmits signals to and from the actuator controllers 26 and 28 along lines 29. For example, the disc control microprocessor 12 can provide a skip function for the disc player in which the optical pickup 14 is transferred between tracks of the recorded disc D. In this instance, the microprocessor may direct the coarse actuator controller 28 to undertake a gross movement of the carriage, and then command the fine actuator controller 26 to produce a smaller incremental movement until the pickup is positioned beneath the desired track. The optical pickup 14 can include a position sensor (not shown) that provides information to the disc control microprocessor 12 to ascertain the current track of information on the disc D.

The mechanics of the movement of the optical pickup 14 are depicted sequentially in FIG. 2. The figure presents a block diagram representation of the carriage 18 supporting the fine actuator 16, which is operable to translate the optical pickup 14. The carriage 18 is driven by the transmission mechanism 22 in response to the coarse actuator 20. As shown in the first position of FIG. 2(a), the optical pickup 14 is in its neutral position N. Preferably, this neutral position is generally centered relative to the carriage 18 and can be maintained by the spring 15.

When a voltage is applied to the fine actuator 16, the optical pickup 14 translates from the neutral position N to a position shown in the next figure of the sequence, FIG. 2(b). As the voltage impressed to the fine actuator 16 gradually increases, the actuator gradually moves the optical pickup 14 to its limit position LP, as depicted in FIG. 2(c). In the illustrated embodiment, the limit position is near one end of the carriage 18 and is disposed apart from the original neutral position N.

At the point in which the optical pickup 14 has reached its limit position, the pickup can be translated no further by the fine actuator 16. Thus, in order for the pickup to continue to radially traverse the surface of the recorded disc D, the carriage 18 must then be translated. The movement of the carriage 18 by operation of the coarse actuator is depicted in FIG. 2(d). As the carriage is translated, the optical pickup 14 remains in its absolute position LP relative to the disc D. Thus, the disc control microprocessor 12 must decrease the applied voltage to the fine actuator 16 so that the spring 15 draws the optical pickup 14 toward its centered neutral position N relative to the carriage 18. At the same time, and in a coordinated fashion, the carriage 18 is translated in an opposite direction radially outward relative to the disc D. With this coordinated movement, the optical pickup 14 is returned to its neutral position, now designated N', as shown in FIGS. 2(d) and 2(e). At that point, then, the fine actuator can be activated to further translate the optical pickup toward its new limit position.

As depicted in the sequence of steps in FIG. 2, the optical pickup 14 is consistently maintained to one side of the neutral position N. Alternatively, an opposite voltage can be applied to the fine actuator 16 to draw the pickup 14 to the left of the neutral position. In either case, the relocation of the carriage 18 relative to the optical pickup 14 requires cooperative control of the fine actuator controller 26 and the coarse actuator controller 27 so that the coarse movements of the carriage 18 do not disrupt the continuous reading of data from the disc D.

One problem faced by compact disc players arises when power to the various driving components is interrupted, or cut-off, and then subsequently restored. When power is interrupted In disc players having a spring-centered fine actuator, the lens may spring back over more than a minute of disc play time. On the other hand, CD players having only coarse actuators that can be servo-locked in position are generally difficult to tune to accurately and continuously read the recorded data in the small tracks of a compact disc.

A fine actuator, such as the actuator 16 depicted in FIG. 1, permits accurate positioning and tracking of the optical pickup 14 relative to the recorded medium. Circuitry can be provided within the disc player to provide feedback to the disc control microprocessor 12 and fine actuator controller 26 based on tracking error or focusing signals. However, the introduction of the fine actuator leads to a significant problem in restoring the position of the optical pickup to its last position when power was interrupted.

In some systems, the disc controller reads current sub-code information and table of contents (TOC) from the recorded disc. When power is interrupted, this information is stored in a local memory. When power is restored, the sub-code and TOC information is read and the optical pickup 14 is moved to the start of the recorded track before the normal operating mode, or play mode, is resumed. One disadvantage of this approach is that a certain portion of the data in the current track is necessarily re-read by the optical pickup, unless the power happens to stop at when the pickup is at the beginning of a track. In the case of an audio disc, the listener must hear same audio piece from the beginning if power is momentarily interrupted and then reconnected. In some cases, this error can be as large as the entire audio track, depending of course on the position of the optical pickup when power was interrupted.

In another approach, the current position of the optical pickup is maintained by continuously storing the current sub-code information in a non-volatile memory, such as an EEPROM or bubble memory device. When the power is reconnected, the system reads the sub-code information from the recorded medium, or disc, and compares that information with the stored sub-code information. The disc controller then calculates how far the optical pickup must jump to achieve the stored position of the pickup. After a proper amount of track jumping, the pickup is restored generally to its position prior to the power interruption, and the disc player resumes its play mode.

There remains a need for a disc player having a system that can accurately return the optical pickup to its position prior to a power interruption. There is further a need for such an apparatus and method that is readily adapted to a disc player having both fine and coarse movement control.

SUMMARY OF THE INVENTION

The shortcomings of prior resume control systems and methods are overcome by the present invention. To take advantage of certain features of the inventive apparatus and method, the disc player is provided with a coarse actuator and a fine actuator for controlling the radial movement of the disc pickup. The fine actuator is mounted on a carriage that is translated by operation of the coarse actuator. In one feature of the invention, the fine actuator is a coil-type actuator that translates the pickup in relation to a voltage applied to the actuator. In other words, as the magnitude of the voltage increases, the magnitude of the pickup travel increases. In accordance with this feature, the pickup returns to a neutral position when voltage to the fine actuator is interrupted.

In a preferred embodiment of the invention, the disc control electronics is augmented by an apparatus that stores information indicative of the magnitude of the voltage signal applied to the fine actuator. In a specific embodiment, the control signal from the disc control microprocessor is processed and stored in a non-volatile memory during the normal operation of the CD player. When power to the disc player is interrupted, this stored signal represents the position of the fine actuator relative to the carriage. De-energizing the fine actuator causes the pickup to return to its neutral position. When power is restored, the stored control signal is read by the disc controller and used to determine the control signal to be provided to the controller for the fine actuator. The fine actuator is re-energized with substantially the same voltage that was applied at the moment power was interrupted.

In another feature of the invention, the disc control microprocessor executes a sequence of steps in controlling the disc electronics during power interruption and resumption. In one embodiment, when power to the CD player is interrupted, the player is placed in a pause mode in which the disc continues to rotate but the disc player output is muted. The control microprocessor then determines an average position value of the disc pickup relative to the carriage over a predetermined number of disc revolutions. This average position value can be obtained by taking a numerical average of the fine actuator control signals provided by the microprocessor to the fine actuator controller. In a typical disc player, successive fine actuator control signals will vary as a function of tracking error or focussing signals supplied to the microprocessor.

This average value signal is stored in memory and the various disc controllers and motors are de-energized. When power is resumed, the drive controllers and motors are re-energized and the disc control microprocessor determines the current position of the disc pickup over a fixed number of disc revolutions. The same averaging method can be utilized to determine an average position of the pickup relative to the carriage. A comparison is made between this current position value and the position value stored in memory at the instant of the power interruption.

If the stored position value and current position value are equal, or in certain embodiments within a certain range, the disc control microprocessor unmutes the disc player output and normal play mode is resumed. On the other hand, if the two position values do not match, the control microprocessor directs the fine actuator controller to increment the position of the pickup relative to the carriage. In one embodiment, a fixed voltage increase is applied corresponding to movement of the pickup over a certain number of disc tracks or grooves. In one specific embodiment, the fine actuator controller can direct the fine actuator to jump the pickup over three grooves. The new position of the pickup is evaluated and compared to the stored position value. This process continues until the current and stored position values correlate.

It is one object of the present invention to provide a system and method for resuming normal operation of a compact disc player following a power interruption. A more specific object is to provide a resume function that restores the disc pickup to the position it had reached at the point of the power interruption.

One benefit of the apparatus and method of the invention is that minimal modifications are required to existing disc player electronics. A further benefit achieved by the present invention is that normal operation of the disc player can be faithfully resumed after a power interruption so that the disc player "picks up where it left off".

Other objects and benefits of the invention can be discerned from the following written description and accompanying figures.

DESCRIPTION OF THE PREFERRED EMBODIMENT

Figure 1:
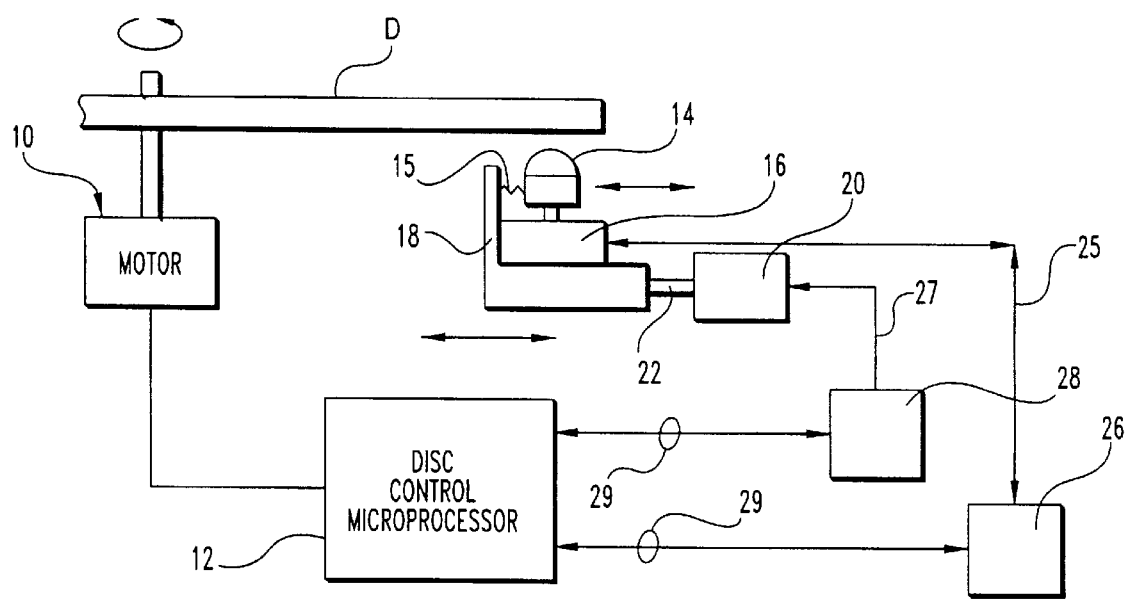
FIG. 1 is a block diagram of components of a disc player, namely the actuator and drive components of the player.

For the purposes of promoting an understanding of the principles of the invention, references will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

The present invention contemplates a system and method for resuming play in a compact disc player, such as the player shown in the block diagram of FIG. 1. In particular, the present invention is adapted for use with a CD player in which the disc pickup 14 is translated by both a fine actuator 16 and a coarse actuator 20. In accordance with certain features of the invention, only the position of the optical pickup 14 relative to the carriage or sled 18 is stored and recalled after a power interruption.

Figure 3:
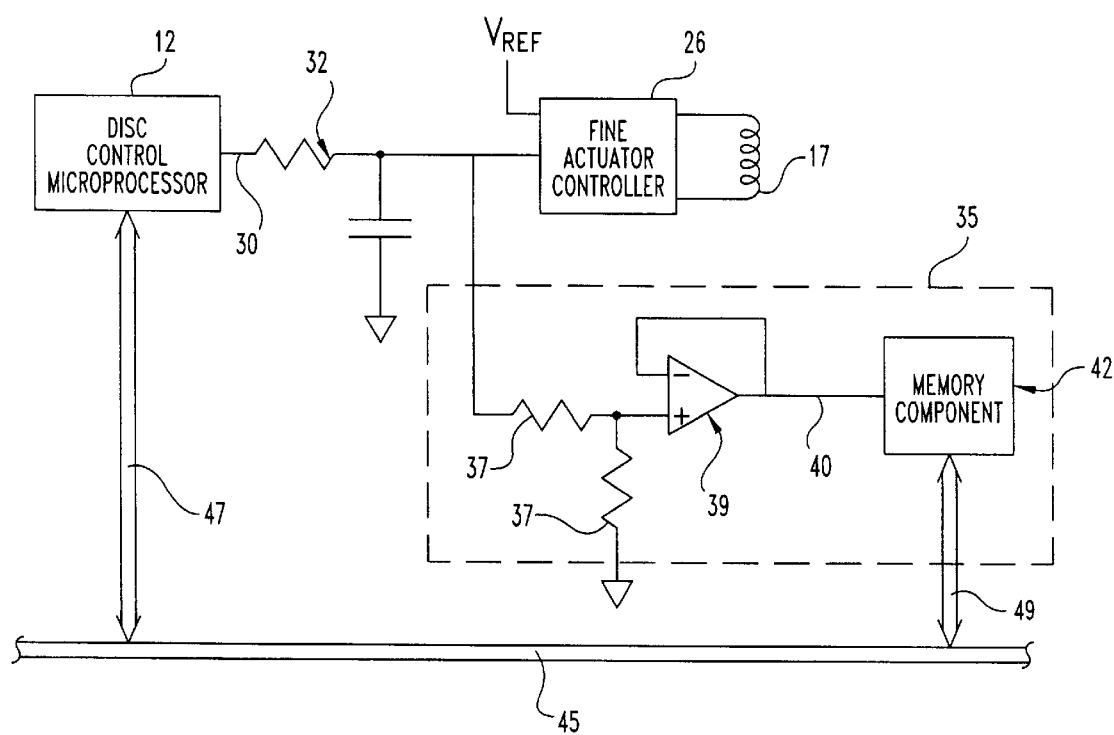
FIG. 3 is a schematic diagram showing electronic components for providing fine movement control for the optical pickup of the disc player shown in FIG. 1.

Referring now to FIG. 3, certain circuit components for implementing the invention are illustrated. In accordance with the preferred embodiment, the fine actuator 16 includes a tracking coil 17. The use of a tracking coil of this type to provide for fine linear movement is known in the art. In certain designs, the coil 17 forms part of a magnetic circuit that includes one or more magnets adjacent a portion of the actuator supporting the pickup. The amount of movement of the pickup relative to the carriage depends upon the magnitude of the voltage applied to the tracking coil 17. This voltage is provided by the actuator drive controller 26. The actuator drive controller 26 receives a reference voltage $V_{REF}$ and control signal 30 from the disc control microprocessor 12 after first passing through a low-pass filter 32. The fine actuator drive controller includes known circuitry that uses the control signal 30 to determine the magnitude of the voltage $V_{REF}$ impressed upon the tracking coil 17.

In accordance with the preferred embodiment of the present invention, an apparatus 35 is provided for achieving the resume function. In particular, the apparatus 35 receives the filtered control signal 30. This signal passes through a pair of scaling resistors 37 and a buffer op amp 39 to produce a signal 40. This signal 40 is directly proportional to the voltage applied to the tracking coil 17, and therefore directly proportional to the amount of linear translation of the optical pickup 14 relative to the carriage 18.

Figure 2A:
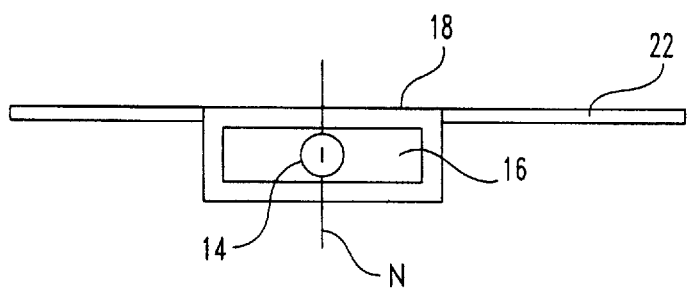
FIG. 2 is a sequential block diagram showing the position of the optical pickup and carriage during a normal operating mode of the disc player shown in FIG. 1.
Figure 2B:
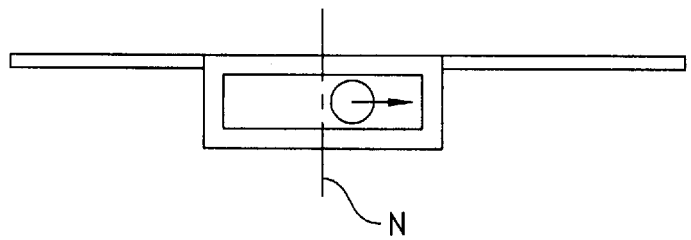
Figure 2C:
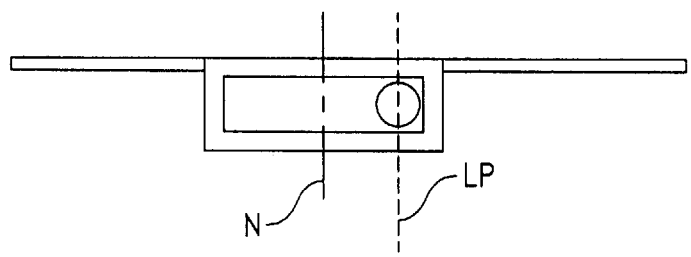
Figure 2D:
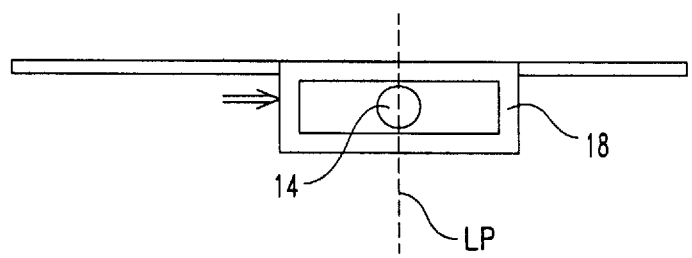
Figure 2E:
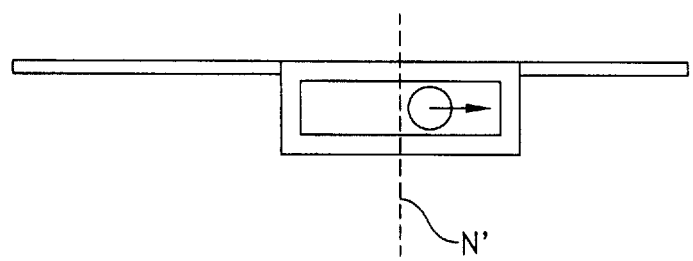

In accordance with the preferred embodiment, this magnitude signal 40 represents the degree of offset of the optical pickup 14 from its neutral position, such as the centered position N shown in FIG. 2(a). Consequently, the magnitude signal 40 is representative of a positive voltage applied to the tracking coil 17. Alternatively, where the tracking coil 14 can be moved in either direction relative to its neutral position N, the voltage applied to the tracking coil 17 may also be negative. In this instance, the magnitude signal 40 will be positive or negative depending upon the sense of the applied voltage.

In a further component of the present invention, a memory component 42 is provided as part of the apparatus 35. This memory component can be incorporated into the disc control microprocessor 12 or provided as an external non-volatile memory component, such as an EEPROM. In certain embodiments, the memory component 42 forms part of an integrated circuit that includes an analog-to-digital converter. This converted digital value is then maintained in the memory component 42 and is indicative of the magnitude signal 40, and ultimately of the magnitude and sign of the voltage applied to the tracking coil 17.

The preferred embodiment contemplates that the memory component 42 is a solid state memory circuit that includes a non-volatile memory element and associated processing circuitry. Alternatively, the memory component can constitute an analog memory element, such as a capacitance element. With this alternative, no A/D conversion is necessary.

The memory component 42 is preferably linked to an internal communications bus 45 for the CD player by way of a data bus 49. Similarly, the disc control microprocessor 12 is linked to the internal bus 45 by way of its own data bus 47. In this way, information within the memory component 42 can be accessed by the control microprocessor 12. In addition, the control microprocessor 12 can provide control signals to the memory component 42 to erase the memory or otherwise modify its contents, or to direct the operation of circuit elements of the memory component.

The disc control microprocessor 12 can include components for sensing the occurrence of events that disturb the position of the optical pickup. For instance, a power interruption will cause the fine actuator to be de-energized so the optical pickup moves to its neutral position. The converse of a power interruption may be a voltage spike that causes the fine actuator to jump positions. Another event may be jarring or excessive vibration of the disc player, which causes the optical pickup to skip disc tracks. The microprocessor 12 includes appropriate sensors and/or circuitry for determining the onset of such events and for initiating the resume features afforded by the present invention.

Utilizing the resume apparatus 35 shown in FIG. 3, the invention contemplates a sequence of steps that can be generally administrated by the disc control microprocessor 12. At the instance of the particular event, such as an interruption of the power to the CD player, at step 50, the disc control microprocessor 12 mutes the audio in step 52. In the case in which the disc D is not an audio disc, the output from the disc player is interrupted. In the next step 54, the controller places the control circuitry in the pause mode. In this mode, the signals from the coarse actuator controller 28 are interrupted, meaning that the coarse actuator 20 no longer translates the carriage 18 relative to the disc D. However, the signals to the motor 10 continue so that the motor is still rotating the disc D. Similarly, control signals from the fine actuator controller 26 are provided to the fine actuator 16.

In the next step 56, the average position of the optical pickup 14 is determined relative to the carriage 18. In the pause mode, the feedback or tracking error control for the optical pickup 14 is still operative. Thus, the control microprocessor 12 continues to try to focus the optical pickup 14 on the specific recorded track of the disc D. Because of inherent eccentricity of both the recorded medium and the spindle shaft of the motor 10, the position of the optical pickup 14 must be obtained as an average position.

Figure 4:
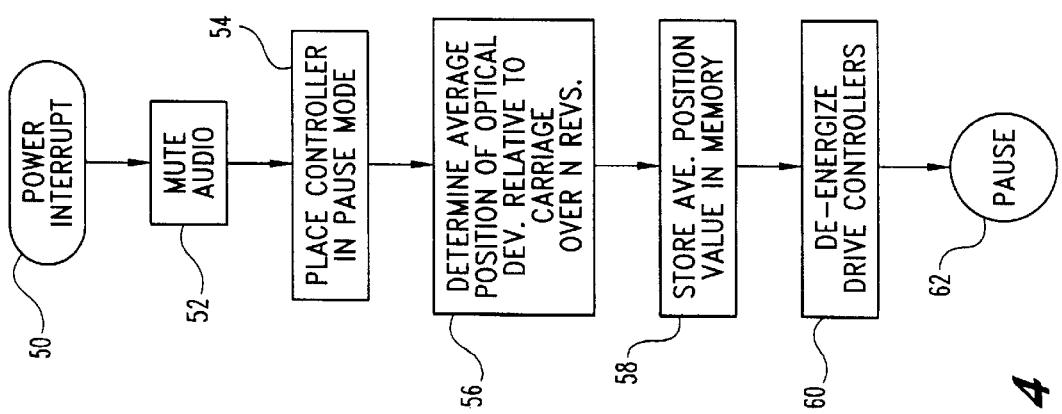
FIG. 4 is a flowchart of steps accomplished by the system of the present invention when power is interrupted to the disc player.

In accordance with the present invention, the memory component 42 can constitute an integrated circuit that includes not only the A/D conversion components, but also can include components for determining the average of the magnitude signal 40 over the predetermined time period. In the steps illustrated in FIG. 4, this average position of the optical pickup 14 is determined over a predetermined number of revolutions of the disc D. A signal from the control microprocessor 12 can be provided along data buses 47, 45 and 49 to the memory component 42 to control this averaging process. The invention contemplates any suitable averaging technique that can operate on the magnitude signal 40 or it's A/D converted value. The variations in the fine movement of the pickup due to disc and mechanism eccentricity can be readily addressed in this averaging process.

The microprocessor 12 can then provide a signal to the memory component 42 to direct the circuit to store this average position value in memory, in step 58. Once this value has been stored, the disc control microprocessor 12 de-energizes the motor 10 and the actuators 16 and 20 in step 60. In the case of the coarse actuator 20, the microprocessor can direct that the coarse actuator be servo-locked. Finally, the CD player enters a pause mode in step 62.

Figure 5:
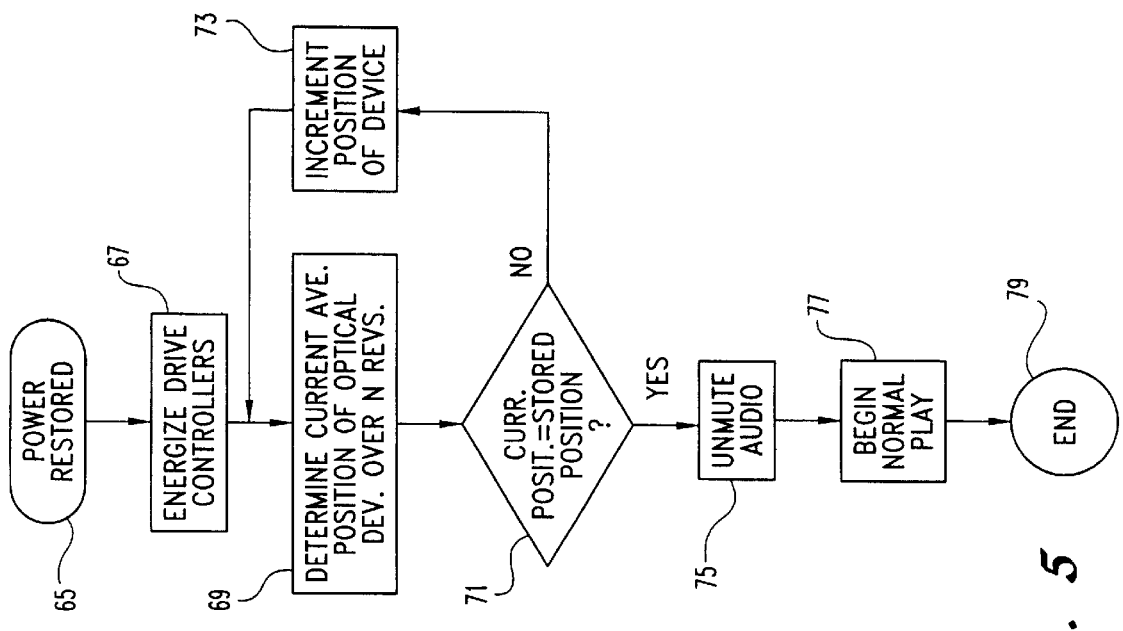
FIG. 5 is a flowchart of steps accomplished by the system of the present invention when power is restored to the disc player.

The steps followed once power is restored are shown in the flowchart of FIG. 5. When power is restored in step 65, the control microprocessor 12 energizes the drive or actuator controllers in step 67, including the position sensors for the optical pickup 14. Then, in step 69 the current position of the optical pickup is determined over a fixed number of revolutions of the disc D. Unlike the prior art compact disc players, the present invention is not evaluating the position of the pickup relative to the recorded tracks on the disc D. Instead, a determination is made as to the position of the pickup relative to the carriage connected to the coarse actuator.

Again, since the fine actuator is manipulated to correct tracking errors of the pickup, the average position of the pickup over several disc revolutions must be determined. As previously described, this average position calculation can be made in the memory component 42 under control of the microprocessor 12. Alternatively, the disc control microprocessor 12 can include electronics and/or software to calculate this average position based upon signals conveyed along the communications bus 45. In a specific embodiment, the average position value for the pickup can be obtained over three disc revolutions. For a typical CD player, the average position value can be captured within a few milliseconds.

Once the current position of the pickup is determined, a comparison is made in step 71 between the magnitude value corresponding to that current position and the stored position information extracted from the memory component 42. If these values are not equal, control passes to step 73 in which the disc control microprocessor 12 directs the actuator controller 26 to incrementally move the optical pickup. In accordance with the preferred embodiment, this incremental movement is achieved by incrementally increasing the voltage to the tracking coil 17. Further in accordance with the preferred embodiment, the control microprocessor 12 increments the optical pickup a distance corresponding to a fixed number of disc tracks or grooves. As an example, the position of the pickup is translated in three groove increments.

After the position of the pickup has been incremented, the current position of the pickup is again evaluated in step 69 and that current position compared to the stored position magnitude value in the conditional of step 71. The steps 69, 71 and 73 are repeated until the outcome of the conditional step 71 is affirmative. In that circumstance, the current position of the optical pickup corresponds to the stored position of the pickup. More specifically, the magnitude of the filtered control signal 30 provided by the microprocessor 12 to the fine actuator drive 26 corresponds to the magnitude of the signal 40 stored within the memory component 42.

After the conditional step 71 is satisfied, flow passes to step 75 in which the audio is unmuted. Again, if the disc D is not an audio disc, the circuitry that presents the output from the optical pickup 14 into a useable fashion is activated. Finally, the disc control microprocessor 12 activates the disc player to operate in its normal play mode in step 77 and the resume sequence of steps is terminated in step 75.

It can be appreciated that the apparatus and method of the present invention allows a disc player to resume its normal operation essentially at the point it was operating when the power to the system was interrupted. This resume feature is accomplished with a minimal of additional electronic components. Moreover, the additional components are not high sensitivity elements and do not require significant modification to the existing CD controller microprocessor 12.

In the illustrated embodiment, the conditional step 71 evaluates the magnitude of the control signal at the current position of the pickup relative to the magnitude of the stored control signal value. In the specific embodiment, a substantially exact correspondence between magnitudes is contemplated. However, the conditional step 71 can evaluate the current position signal relative to a range or envelope surrounding the stored magnitude value. In this instance, a certain amount of overlapped or overlooked recorded material may be implicated. However, this subject material will be of very limited duration and generally unnoticed by the CD user. For example, one revolution of the disc D for a typical CD player corresponds to about ⅒ of a second of recorded material. Under these circumstances, it has been found that accuracy in the resumed position within about three grooves (i.e. ³⁄₁₀ of a second) is acceptable to the CD listener.

Again referring to the illustrated embodiment, the fine actuator is incrementally activated to progressively advance the optical pickup to its previously stored position. Under a worst case condition, the optical pickup at the time of the power interruption would be at its limit position LP. This limit position could correspond to 10 tracks or grooves of recorded material on the disc. As previously described, the optical pickup can be advanced one track at a time until a match is found between the current position and the previously stored position. Under this approach, the amount of time required before the control microprocessor 12 activates the disc player in its normal play mode might approach 3 seconds. This "down time" can be reduced by having the microprocessor 12 produce control signals 30 that cause the fine actuator 16 to jump the optical pickup over multiple tracks at a time. For example, if a typical audio listener can accept a 3 groove or track error in the resumed position of the optical pickup, the step 73 of the resumed sequence can increment the position of the pickup over 3 grooves, instead of 1 as previously described. In this way, the amount of time necessary to move the pickup to its previously stored position can be cut by about one-third.

As a further alternative, the stored magnitude signal 40 extracted from the memory component 42 can be provided directly to the control microprocessor 12. The control microprocessor can include components to convert that stored magnitude signal to a new control signal applied on signal line 30. In this instance, the fine actuator will move immediately from whatever current position the pickup maintains to the previously stored position. This approach is not acceptable in instances where the position of the optical pickup after the power has been interrupted is not readily ascertained.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

The illustrated embodiment provides a resume function after a power interruption is experienced by the CD player. The same inventive apparatus and method can be applied to other events that disrupt the expected position of the optical pickup as the player is operating. For example, the present resume apparatus and method can be utilized when a disc pickup skips due to jarring or vibration. In this instance, the disc control microprocessor can receive a signal from an event detection device that initiates the sequence of steps illustrated in the flowchart of FIGS. 4 and 5.

What is claimed is:

1. A system within a disc player for moving a pickup used to transfer information between the pickup and a data track formed on a disc, comprising:
   a carriage configured for supporting the pickup thereon:
   a coarse movement apparatus for moving said carriage relative to the data track in a track access direction;
   a fine movement apparatus associated with said carriage and operable to move the pickup relative to said carriage to positions in said track access direction, said fine movement apparatus including;
      a magnetic coil mounted on said carriage;
      a fine actuator controller having means for applying a variable voltage to said magnetic coil, whereby when voltage is applied to said coil a magnetic circuit is created that translates the pickup as a function of the magnitude of said voltage; and
      a spring connected between said carriage and the pickup that moves the pickup to a neutral position relative to said carriage when no voltage is applied to said magnetic coil; and
   a resume apparatus for restoring the pickup to a resume position of the pickup relative to said carriage following the occurrence of an event, including;
      means for storing a value indicative of said resume position at the occurrence of the event; and
      control means operable after the event for using said stored value to direct said fine movement apparatus to move the pickup relative to said carriage to said resume position.

2. The system according to claim 1, wherein said coarse movement apparatus includes:
   a coarse actuator connected to said carriage; and
   a coarse actuator controller operable to energize said coarse actuator in response to control signals, whereby said coarse actuator maintains its position when it is not energized.

3. The system according to claim 1, in which the disc player includes a disc control microprocessor and wherein:
   said fine movement apparatus is responsive to fine movement signals from the disc control microprocessor to control the movement of the pickup relative to said carriage; and
   said means for storing of said resume apparatus receives a fine movement signal at the occurrence of the event and is operable to generate said value in relation to said fine movement signal.

4. The system according to claim 3, wherein said means for storing includes a digital memory and means for converting said fine movement signal to said value, in which said value is digital.

5. The system according to claim 3, wherein said control means includes means within the microprocessor for reading said value in said means for storing and for providing fine movement signals to said fine movement apparatus to move the pickup to said resume position.

6. A system in a disc player for moving a pickup used to transfer information between the pickup and a track formed on a disc, the disc player having a microprocessor for controlling the operation of the player, the apparatus comprising:
   a carriage configured for supporting the pickup thereon;
   a coarse movement apparatus for moving said carriage relative to the disc in a track access direction when power is supplied thereto;
   a fine actuator apparatus associated with said carriage and operable to move the pickup relative to said carriage in said track access direction in response to fine movement signals supplied thereto, said fine actuator apparatus operable to return the pickup to a neutral position in the absence of said fine movement signals;
   means within the microprocessor operable in a normal operating mode when power is supplied thereto for continuously providing said fine movement signals to said fine actuator apparatus;
   an apparatus for restoring the position of the pickup when power is restored after an interruption, including;
      means for storing the magnitude of a last fine movement signal when power is interrupted; and
      means, operable when power is restored, for directing said fine actuator controller in a resume mode to provide fine movement signals to said fine actuator apparatus until the magnitude of a fine movement signal is substantially equal to said stored magnitude of said last fine movement signal.

7. The system according to claim 6, wherein said fine actuator apparatus includes:
   a tracking coil supported by said carriage and operable to translate the pickup in relation to a voltage applied to said tracking coil; and
   a fine actuator controller operable to provide said voltage to said tracking coil in relation to said fine movement signals.

8. The system according to claim 7, wherein a reference voltage is applied to said fine actuator controller and said voltage provided by said controller to said tracking coil is a proportion of said reference voltage determined by said fine movement signals.

9. The system according to claim 6, wherein said means for storing includes:

a digital memory; and means for converting said last of said fine movement signals to a digital value, said digital value representing said magnitude of said last fine movement signal.

10. The system according to claim 9, wherein said means for storing includes means for determining an average magnitude of said last fine movement signal over a predetermined time period.

11. For a device having a pickup for transferring information between the pickup and a recording medium supported by the device, the pickup driven by an actuator in response to signals from a controller, a method for restoring the position of the pickup relative to the recording medium after an event has ended to a position at the occurrence of an event, comprising the steps of:

upon the occurrence of the event;

determining the magnitude of the signal provided by the controller to the actuator at the current position of the pickup;

storing a value corresponding to the magnitude of the controller signal; and de-energizing the actuator; and then after the event has ended;

energizing the actuator;

reading the stored value;

providing a signal from the controller to the actuator having a magnitude corresponding to the stored value to move the pickup to the position at the occurrence of the event.

12. The method according to claim 11, wherein the event is a power interruption to the device.

13. The method according to clam 11, wherein said step of determining the magnitude includes determining an average magnitude of the signal over a predetermined time period.

14. The method according to claim 11, wherein the step of providing a signal after the event has ended includes:

providing a current signal to the actuator to move the pickup a predetermined distance;

comparing the magnitude of the current signal to the stored value magnitude; and repeating the providing and comparing steps until the magnitude of the current signal corresponds to the stored value magnitude.

15. The method according to claim 14, wherein the providing and comparing steps are repeated until the magnitude of the current signal falls within a predetermined range around the stored value magnitude.

16. The method according to claim 14, wherein the step of providing a current signal includes determining a current signal that is an average of signals over a predetermined time period.

17. A system within a disc player having a disc control microprocessor and operable to move a pickup used to transfer information between the pickup and a data track formed on a disc, comprising:

a carriage configured for supporting the pickup thereon:

a coarse movement apparatus for moving said carriage relative to the data track in a track access direction;

a fine movement apparatus associated with said carriage and operable to move the pickup relative to said carriage to positions in said track access direction in response to fine movement signals from the disc control microprocessor; and a resume apparatus for restoring the pickup to a resume position of the pickup relative to said carriage following the occurrence of an event, including;

means for storing a value in relation to a fine movement signal at the occurrence of the event indicative of said resume position; and control means operable after the event for using said stored value to direct said fine movement apparatus to move the pickup relative to said carriage to said resume position.

18. The system according to claim 17, wherein said fine movement apparatus includes:

a magnetic coil mounted on said carriage; and a fine actuator controller having means for applying a variable voltage to said magnetic coil, whereby when voltage is applied to said coil a magnetic circuit is created that translates the pickup as a function of the magnitude of said voltage.

19. The system according to claim 18, wherein said fine movement apparatus includes a member connected between said carriage and the pickup that moves the pickup to a neutral position relative to said carriage when no voltage is applied to said magnetic coil.

20. The system according to claim 19, wherein said member is a spring.

21. The system according to claim 17, wherein said coarse movement apparatus includes:

a coarse actuator connected to said carriage; and a coarse actuator controller operable to energize said coarse actuator in response to control signals and to maintain the position of said coarse actuator when not energized.

22. The system according to claim 17, wherein said means for storing a value includes a digital memory and said value is a digital value.

23. The system according to claim 17, wherein said control means includes means for reading said value and for providing fine movement signals to said fine movement apparatus in relation to said value.

* * * * *